United States Patent [19]
Kwiatkowski

[11] 3,920,768
[45] Nov. 18, 1975

[54] ARYLIMIDE-EPOXY RESIN COMPOSITES
[75] Inventor: George T. Kwiatkowski, Green Brook, N.J.
[73] Assignee: Union Carbide Corporation, New York, N.Y.
[22] Filed: Jan. 14, 1974
[21] Appl. No.: 433,114

[52] U.S. Cl. ......... 260/837 R; 117/124 E; 161/185; 260/47 EN; 260/49; 260/59; 260/78 UA; 260/326.3; 260/326.5 FM; 260/836
[51] Int. Cl.$^2$ ....................................... C08G 45/12
[58] Field of Search ........... 260/47 EN, 2 N, 59, 49, 260/78 UA, 326.3, 326.5 FM, 326.26, 836, 837

[56] References Cited
UNITED STATES PATENTS
3,730,948   5/1973   Akiyama et al....................... 260/47

Primary Examiner—Melvin Goldstein
Assistant Examiner—T. Pertilla
Attorney, Agent, or Firm—B. F. Crowe

[57] ABSTRACT

Arylimides prepared from oligomer diamines and polyamines and maleic anhydride have been blended with epoxy resins to provide compositions which can be cured to thermoset composites.

10 Claims, No Drawings

ARYLIMIDE-EPOXY RESIN COMPOSITES

BACKGROUND OF THE INVENTION

This invention pertains to thermosetting resins and more particularly to arylimide/epoxy-resin composites.

Thermosetting resins have been used successfully as molding powders, or laminating and bonding and in coating operations. Representative examples of thermosetting resins include furane resins, phenolformaldehyde resins, melamine-formaldehyde resins, urea-formaldehyde resins, polyester-styrene resins and epoxy resins. These vary in their physcial and chemical properties which determine their various end uses.

It is an object of this invention to provide a resin system suitable for curing to tough thermally stable thermoset composites having high glass transition temperatures (Tg) and high modulus plateaus above the Tg, a combination of properties not readily provided by prior art thermosetting resins.

SUMMARY OF THE INVENTION

A resin composition which can be cured to a thermoset composite has been found meeting the object of this invention which comprises:

A. about 5 to about 95% by weight of an arylimide having the formula:

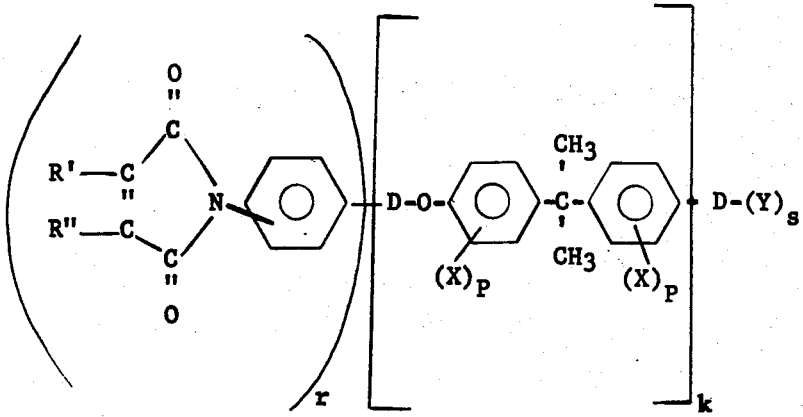

wherein D is at least one radical, selected from the group consisting of:

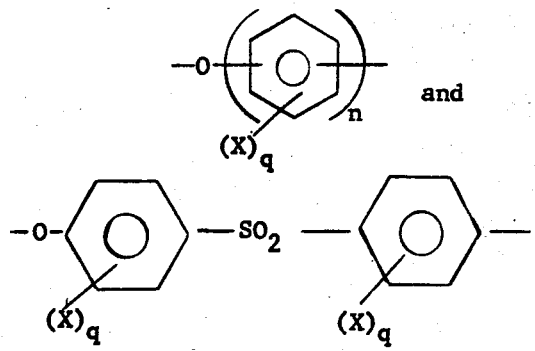

wherein Y is a radical having the formula:

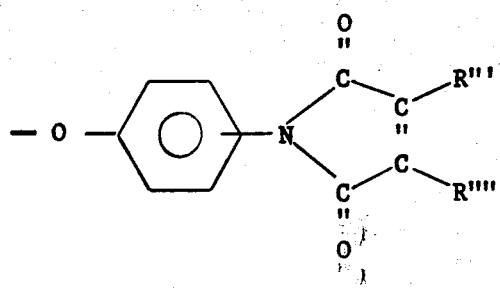

wherein each of R', R'', R''', and R'''' is a monovalent radical selected from the group consisting of H, lower alkyl having 1 to 8 carbon atoms or chlorine, $r$ is an integer having values of 1 to 3;
$s$ is an integer having values of 0 to 3 with the proviso that when $s$ is 0, Y is H or X;
$n$ is an integer having values of 1 to 5;
$k$ is an integer having values of 0 to 100;
X is halogen selected from the group consisting of F, Cl, or Br, and each of $q$ and $p$ are integers having values of 0 to 4, and B. about 95 to about 5% by weight of an epoxy resin having an average of more than one epoxy group,

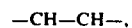

per molecule.

The preparation of the arylimide components may be best illustrated by the condensation of a diamine with maleic anhydride as shown below:

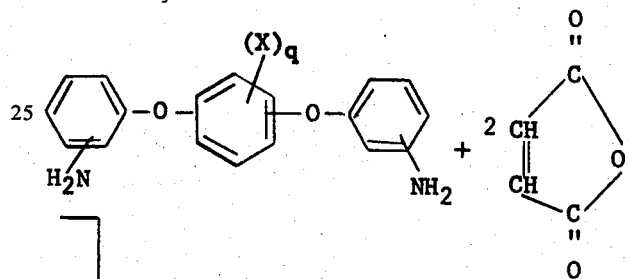

DIMETHYLACETAMIDE →

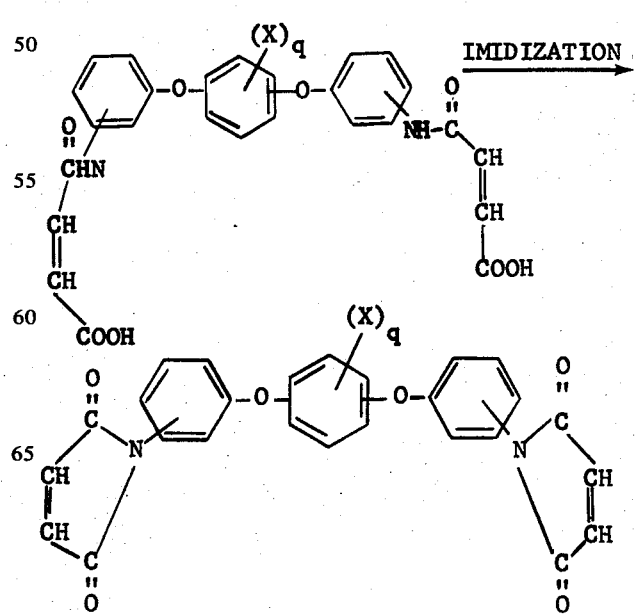

IMIDIZATION →

A more economical process for preparing arylimides involves synthesizing the arylamines in a solvent which allows direct in situ conversion to the corresponding maleimide.

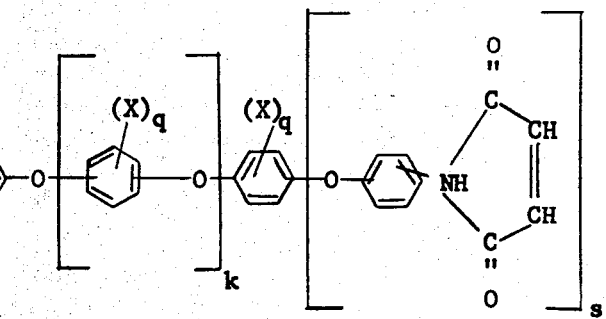

In this case, the sequence of reactions is as follows:
1. formation of the sodium salt of p-aminophenol using sodium hydroxide in N-methylpyrrolodinone and in the presence of the chlorinated polyaromatic and an azeotropic solvent;
2. azeotropic distillation of the water formed followed by distillation of the azeotropic solvent;
3. completion of the condensation reaction at about 140°–170°C.;
4. addition of an equivalent amount of maleic anhydride to the reaction mixture at room temperature;
5. dehydrative imidization of the intermediate N-arylmaleamic acid by addition of acetic anhydride containing 10% soium acetate; 6. recovery of the product by coagulation from water.

Preferred species represented by the generic arylimide formula shown above include the following:
1. Oligomer polysulfone bis(maleimides) having the formula:

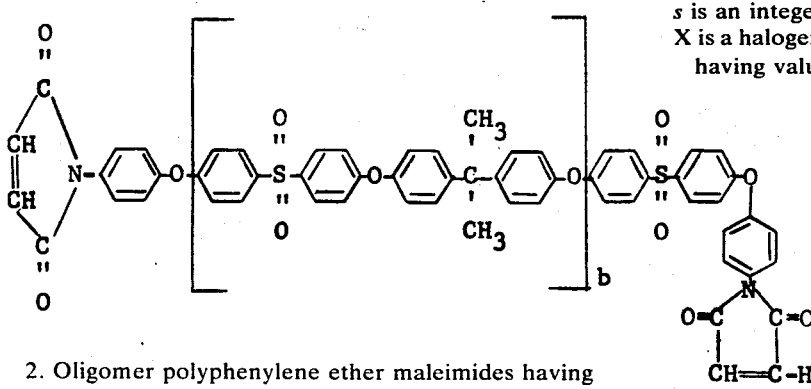

2. Oligomer polyphenylene ether maleimides having the idealized formula:

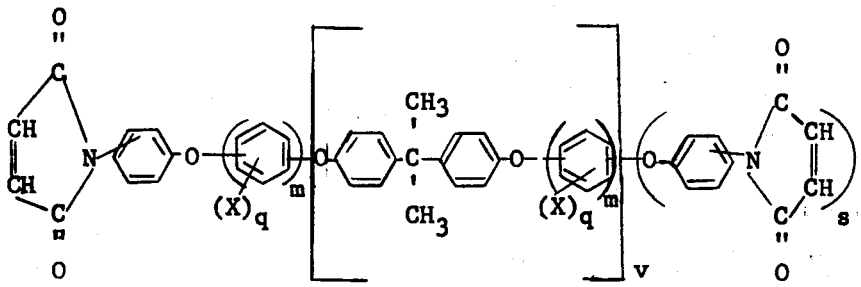

3. Polyphenylene ether maleimides having the idealized formula:

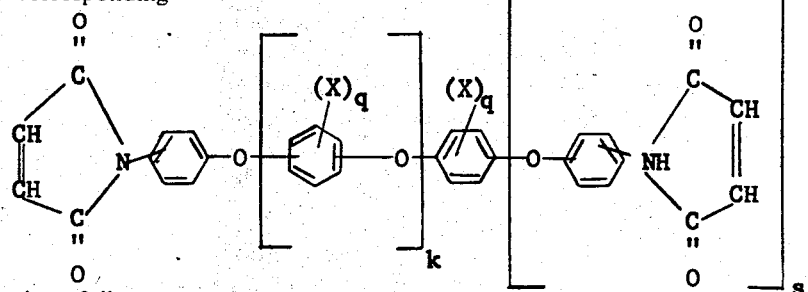

4. Arylether maleimides having the formula:

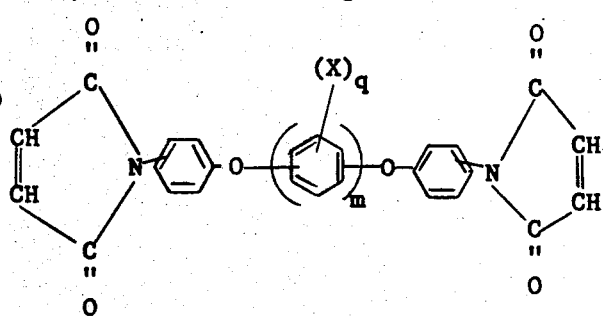

5. Oligomer arylether bisphenol A maleimide having the formula:

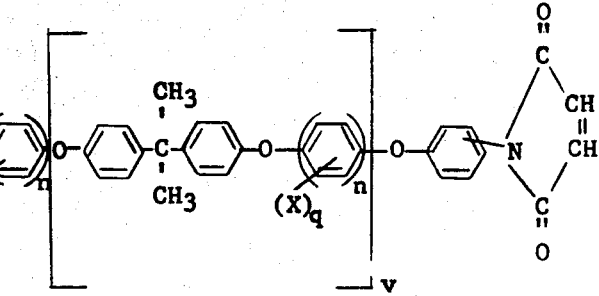

wherein
$s$ is an integer having values of 0 to 3,
X is a halogen and preferably chlorine, $n$ is an integer having values of 1 to 5,

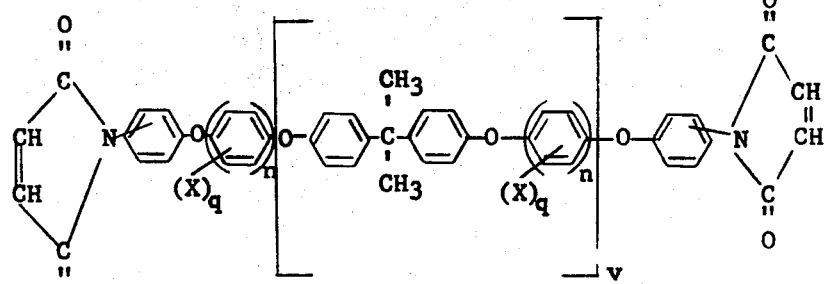

$q$ is an integer having values of 0 to 4 and is preferably 4, $b$ and $k$ are rational numbers having values of 0 to 100, $m$ is an integer having values of 1 to 4 and $v$ is a rational number having values of 1 to about 4.

Especially preferred species of the oligomer polysulfone bis(maleimides) depicted in formula (1) above are those having molecular weights of about 600, 1000, 1500 and 2500.

Preferred species of the oligomer polyphenylene ether maleimides of formula (2) above are those where $m$ is 3. Those maleimides represented by formula (2) can be readily prepared by first preparing polyamines by condensation of the sodium salt of p-aminophenol with a halogenated, preferably chlorinated, polyphenyl in a highly polar solvent such as dimethylsulfoxide or dimethylformamide or N-methylpyrrolidinone followed by recovery of the product by coagulation from water. The chlorinated polyphenyls thus obtained are a multi-component mixture. For example, condensation of three moles of sodium p-aminophenolate with a 60% by weight chlorinated terphenyl (commercially available under the trademark Aroclor 5460 from Monsanto Chemical Co.) afforded a product with a titrated amine equivalent weight of 281.

Three products were identified by mass spectrometry, viz., $C_{18}H_4Cl_7(OC_6H_4NH_2)_3$, $C_{18}H_5Cl_6(OC_6H_4NH_2)_3$ and $C_{18}H_4Cl_8(OC_6H_4NH_2)_2$. The first two of these products were triamines and the second a diamine. Other polychlorinated benzene reactants which can be used in this invention include hexachlorobenzene, 42% chlorinated biphenyl, (Aroclor 1242 trademark of Monsanto Chemical Co.) 54% chlorinated biphenyl (Aroclor 1254 trademark of Monsanto Chemical Co.) and the like. In the practice of this invention the condensation of sodium p-aminophenolate with halogenated hydrocarbon can be controlled to afford amines containing from one amine group to four amine groups. Any of these amines ccan then be converted to maleamic acids by condensation with maleic anhydride followed by cyclization to maleimide as described above for chlorophenyl amines. Depending on the nature of the amine used one can obtain a series of maleimmides containing from one to four imide functions per molecule. Those containing two to four imide functions per molecule are thermosetting resins. While maleimides containing only one imide function are not thermosetting alone they are when used in combination with the polyfunctional maleimides or other thermosetting systems.

Other useful halogenated benzenes which can be used in this invention include any of the bromo or fluoro derivatives of benzene, diphenyl, terphenyl, tetraphenyl, and the like.

In a similar manner the oligomer polyphenylene ether bis(maleimides) shown by formula (3) above can be obtained by condensing sodium p-aminophenolate with polyhalogenated diphenyl ethers. The resultant amines are then converted to the maleimides. Particularly preferred because of its commercial availability is decabromodiphenyl ether.

As another variation the oligomer polysulfone bis(maleimides) shown in formula (1) can be prepared with increased functionality over that of the normally difunctional amines disclosed therein by first preparing polyfunctional amines by condensing sodium paraaminophenolate, the disodium salt of bisphenol A,(2,2-bis(p-hydroxyphenyl)propane), dichlorodi-

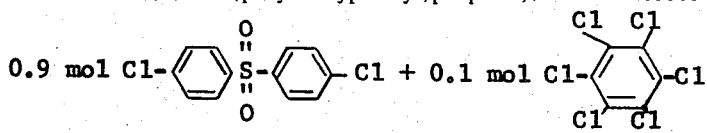

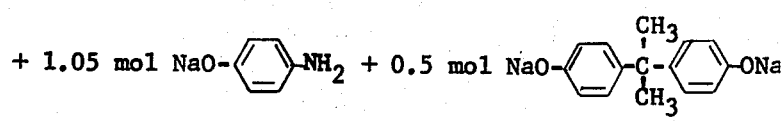

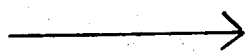

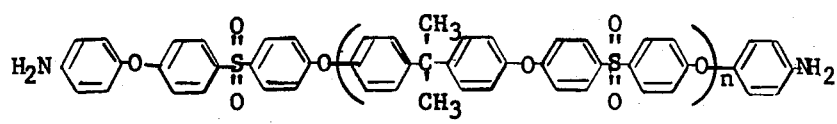

+

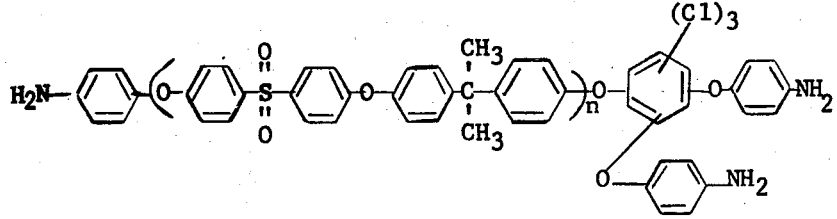

In this particular instance the titrated amine equivalent weight was 429.

Arylether maleimides represented by formula (4) can be prepared as indicated by the following sequence of reactions:

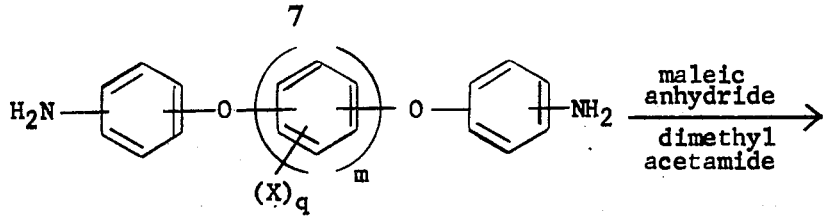

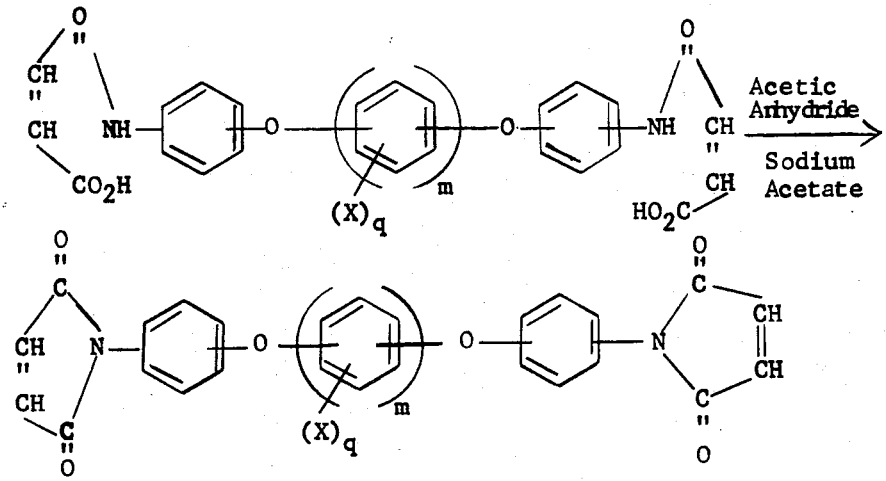

wherein *m* is a integer having values of 1 to 4.

Oligomer arylether bisphenol A maleimides represented by formula (5) can be prepared by

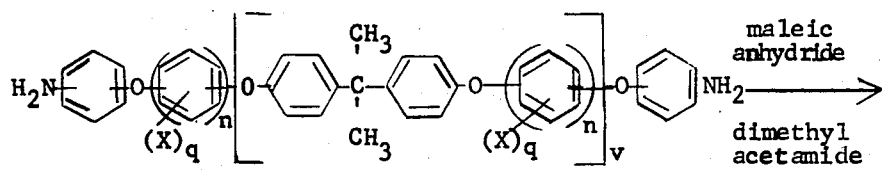

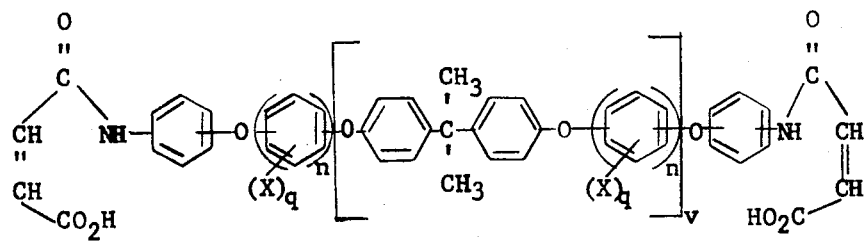

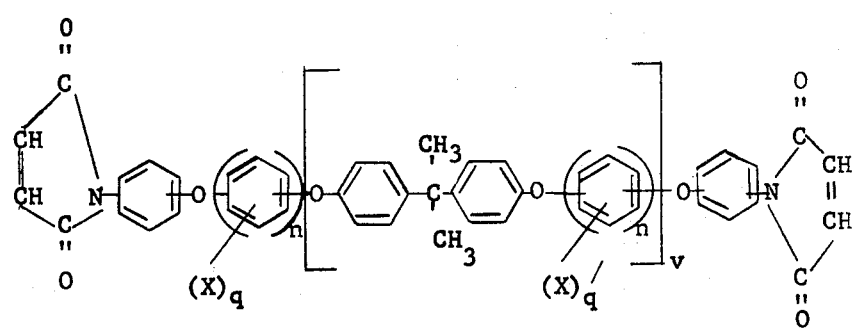

The above-described maleimides can be used as B-stageable resins for the preparation of glass cloth prepregs and adhesives which can be thermally converted to the thermoset state.

The choice of the epoxy resin component in the curable composition of this invention is not narrowly critical. Any of the epoxy resins commercially available which by definition and convention contain more than one vicinal epoxide grouping or oxirane ring, i.e.,

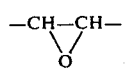

can be used.

Exemplary epoxy resins include the glycidyl ethers of polynuclear polyhydroxy phenols such as bisphenol A, i.e., 2,2-bis (4-hydroxyphenyl)propane, bisphenol F, i.e., bis(4-hydroxyphenyl) methane, trihydroxyl diphenyl dimethylmethane, 4,4-dihydroxylbiphenyl, 1,1-bis(4-hydroxyphenyl)ethane, 1,2-bis(4-hydroxyphenyl) ethane, tetra-(p-hydroxyphenyl)ethane, 1,1-bis-(4-hydroxy-2-chlorophenyl)ethane, 1,1-bis-(3-methyl-4-hydroxyphenyl) ethane, 1,3-bis (3-methyl-4-hydroxyphenyl)propane, 2,2-bis(3-phenyl-4-hydroxyphenyl) propane, 2,2-bis-(3-isopropyl-4-hydroxyphenyl)propane, 2,2-bis-(2-isopropyl-4-hydroxyphenyl)propane, 2,2-bis-(4-hydroxynapththyl) propane, 2,2-bis-(4-hydroxyphenyl) pentane, 3,3-bis-(4-hydroxyphenyl)-pentane, 2,2-bis-(4-hydroxyphenyl)heptane, bis-(4-hydroxyphenyl) phenylmethane, bis-(4-hydroxyphenyl) cyclohexylmethane, 1,2-bis-(4-hydroxyphenyl)-1,2-bis-(phenyl)propane, 2,2-bis-(4-hydroxyphenyl)-1-phenyl-propane and the like; di(hydroxyphenyl)sulfones such as bis-(4-hydroxyphenyl)-sulfone, 2,4'-dihydroxydiphenyl sulfone, 5'-chloro-2,4'-dihydroxydiphenyl sulfone, 5'-chloro-4,4'-dihydroxydiphenyl sulfone, and the like; di(hydroxyphenyl) ethers such as bis-(4-hydroxyphenyl)-ether, the 4,3'-,4,2'-,2,2'-, 2,3'-dihydroxydiphenyl ethers, 4,4'-dihydroxy-2,6-dimethyldiphenyl ether, bis-(4-hydroxy-3-isobutylphenyl)-ether, bis-(4-hydroxy-3-isopropylphenyl)-ether, bis-(4-hydroxy-3-chlorophenyl)-ether, bis-(4-hydroxy-3-fluorophenyl)-ether, bis-(4-hydroxy-3-bromophenyl)-ether, bis-(4-hydroxynaphthyl)-ether, bis (4-hydroxy-3-chloronaphthyl)-ether, 4,4'-dihydroxy-2,6-dimethoxydiphenyl ether, 4,4'-dihydroxy-2,5-diethoxydiphenyl ether, and the like; the diglycidyl ethers of mononuclear phenols such as:

hydroquinone
pyrocatechol
resorcinol
saligenin
phloroglucinol
p-aminophenol, and the like;
epoxidized cycloaliphatic olefins such as:
3,4-epoxycyclohexylmethyl-3,4-epoxy-cyclohexane carboxylate

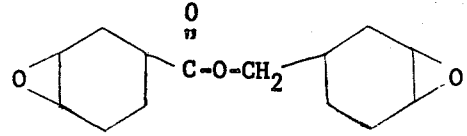

bis(3,4-epoxy-6-methylcyclohexylmethyl adipate

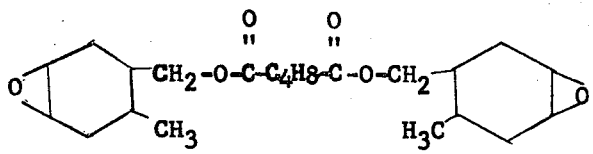

bis (2,3-epoxycyclopentyl)ether

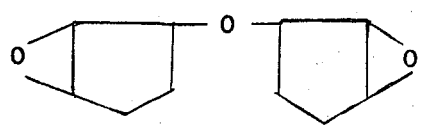

and the like, and

Epoxylated novolac resins such as those described in "Epoxy Resins" by H. Lee and K. Neville, pages 18–20, McGraw-Hill Book Co., Inc. (1957) as having the general structure:

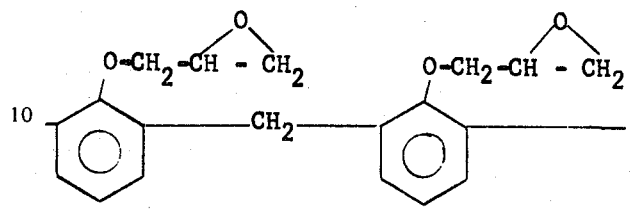

The curable arylimide/epoxy resin compositions of this invention do not require a curing or hardening agent to effect their conversion to a tough thermoset composite. Curing by heating is sufficient to achieve this state with temperatures in the range of about 220° to about 280°C. being preferred although temperatures in the range of about 150°C. to about 350°C. can be used.

Although a curing or hardening agent is not required one can be used if desired as for example an amine, an anhydride, or a phenol.

Representative amines include aliphatic amines, such as, diethylene triamine, triethylene tetraamine, dimethylamino propylamine, and the like; aromatic amines, such as metaphenylene diamine, 4,4'-methylene dianiline, diamino diphenyl sulfone; aralkyl amines such as, benzyldimethylamine, 2-methylbenzyl dimethylamine, dimethylamino methyl phenol, and the like.

Exemplary anhydride curing agents are tetrahydrophthalic anhydride, phthalic anhydride, pyromellitic dianhydride, maleic anhydride, dichloromaleic anhydride, dodecenyl succinic anhydride, chlorendic anhydride, and the like.

Examples of phenolic curing agents include bisphenol A or 2,2-bis(p-hydroxyphenyl)propane, trisphenol as well as phenol aldehyde condensation resins containing phenolic residues such as the novolaks.

The fabricating annd mechanical properties of the composites produced by this invention are superior to those of either the arylimide component or the epoxy component when cured alone. This is demonstrated by such properties as:

1. Glass transition temperatures >200°C,
2. Modulus plateaus above the Tg of $>10^8$ dynes/cm$^2$,
3. Low pressure fabrication requirements, and short post cure requirements,
4. Outstanding thermal and oxidative stability at 260°C. and above, and
5. Good hydrolytic stability.

Although about 5 to about 95% by weight of arylimide can be used in the thermosetting compositions of this invention, it is preferred to use about 70 to about 90% by weight.

The arylimides and epoxy resins can be blended together using conventional mixing equipment such as a Banbury mixer, two roll mill and the like.

These thermosetting resin compositions can be used for the fabrication of molded articles, laminates and graphite composites as well as adhesives and friction or abrasive binders.

The invention is further described in the examples which follow. All parts and percentages are by weight unless otherwise specified.

EXAMPLE 1

A. Preparation of Arylimide from 2.1 Moles of p-Aminophenol and 1.0 moles of Aroclor 5460

A 36 gallon reactor equipped with a stirrer, thermocouple, nitrogen inlet, condenser and water-xylene separator was charged with:

| | | |
|---|---|---|
| p-Aminophenol | | 15.14 lbs. |
| Aroclor 5460 | (60% chlorinated terphenyl) | 38.19 lbs. |
| Xylene | | 8.0 Gal. |
| N-Methylpyrolidinone | | 9.0 Gal. |

The reactor was sparged with nitrogen and heated to reflux. At reflux, 11.05 lbs. of NaOH solution (49.7%) was added slowly over 1 hour.

After completion of the sodium hydroxide addition, the system was dehydrated. Xylene was then distilled off until a pot temperature of 165°C was attained. The mixture was then stirred for 0.5 hour at 165°C. and cooled to room temperature.

At room temperature, 13.61 lbs. of maleic anhydride were added over an approximately 10 minute period to minimize any exotherm. The reactor contents were then stirred 1 hour at room temperature and 14.17 lbs. of acetic anhydride and 2.71 lbs. of sodium acetate were added. After stirring at room temperature for 2 hours, the material was discharged from the reactor.

The product was recovered by coagulation in five times its volume of water. The precipitated material was collected by filtration and the filter cake re-slurred in water and refiltered. The product was then dried to a constant weight at 65°C. under vacuum.

The material exhibited a melting point of 97°–113°C. Torsion pendulum data obtained on a cured sample indicated a Tg at 255°C. and a modulus plateau about the Tg of $4.2 \times 10^9$ dynes/cm².

B. Blending of Arylimide with Epoxylated Novolak

A mixture of 70 grams of the arylimide prepared in (A) and 30 grams of an epoxylated novolak having an epoxy equivalent of 180–220g./g. mole oxirane oxygen and believed to have the idealized formula:

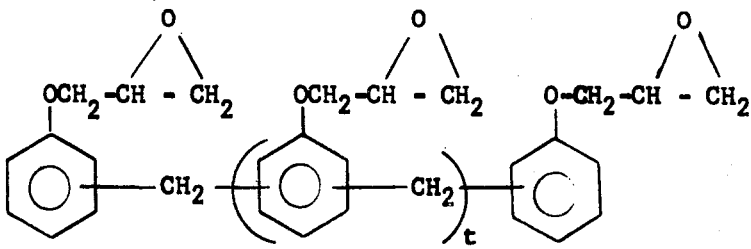

(where $t$ has an average value of 6) was melt blended on a two roll mill at 160°C. The blend was then B-staged at 265°C. for 2 minutes and finally compression molded at 265°C. for 3 minutes. The 4×4×0.040 inch plaque was postcured at 265°C. for 60 minutes and used for the measurement of mechanical properties of the thermoset composite obtained.

Torsion pendulum data of the thermoset composite indicated a glass transition temperature, Tg. of 190°C. and a tensile modulus plateau above the Tg of 35,000 psi., a shear modulus of $1.1 \times 10^{10}$ dynes/cm² and a shear modulus above the Tg of $8.5 \times 10^8$ dynes/cm².

A torsion pendulum apparatus was used for these composite characterization measurements. The most important aspect of the torsion pendulum data involves the determination of secondary glass transitions. The determination of G', the real part of the complex shear modulus, has significance in that G' versus temperature resembles an E-T curve which is commonly used for polymer characterization. G'', the imaginary part of the complex shear modulus, represents the viscous component of the shear modulus. Therefore peaks for G'' versus temperature also correspond to transitions. A detailed explanation for determining the Tg, shear modulus, and shear modulus plateau can be found in "Mechanical Properties of Polymers" by L. E. Nielson, Reinhold, New York (1962). High values for the tensile modulus plateau above the Tg, indicate high-crosslinked density of specimens so tested. Tensile modulus was calculated from shear modulus measurements.

EXAMPLE 2

Exmple 1 was repeated using a blended mixture of 90 grams of the arylimide prepared in Example 1(A) and 10 grams of epoxylated novolak described in Example 1(B). The resulting blend was B-staged for 4 minutes at 265°C. and molded under pressure at 265°C. for 5 minutes. The resulting plaque was post-cured at 265°C. for 1 hour and used for testing.

Torsion pendulum data indicated a Tg at 232°C., a tensile modulus plateau of 48,000 psi and a shear modulus plateau of $1.1 \times 10^9$ dynes/cm².

EXAMPLE 3

Example 1 was repeated with the exception that 30 grams of BAKELITE liquid epoxy resin ERL-2772 (trademark for a diglycidyl ether of bisphenol A having a viscosity at 25°C. of 7,000–9,000 centiposes, an apparent specific gravity (25°C/25°) of 1.15–1.17 and an epoxy equivalent (grams/gram mole of oxirane oxygen) of 175–185) was used in place of the epoxylated novolak. The resulting blend was B-staged for 4 minutes at 265°C. and molded under pressure at 265°C. for 5 minutes. The resulting plaque was post-cured at 265°C. for 1 hour and used for testing. Torsion pendulum data indicated a Tg at 145°C. and a tensile modulus plateau at $1.0 \times 10^8$ dynes/cm².

EXAMPLE 4

Example 1 was repeated with the exception that the epoxylated novolak was replaced by 30 grams of a tetraglycidyl ether of tetra (p-hydroxyphenyl ethane having an epoxy equivalent of 190–240 grams/gram mole of oxirane oxygen. After melt blending at 250°C. for 7 minutes to attain a B-staged uniform blend, the mixture was compression molded at 265°C. for 1 hour. The torsion pendulum data indicated a Tg of 215°C. for the composite with a room temperature shear modulus of $1.35 \times 10^{10}$ and a shear modulus above the Tg of $6.0 \times 10^8$.

EXAMPLE 5

A laminate was prepared by preparing a solution of 30 parts of a triglycidyl ether of p-aminophenol having an epoxy equivalent of 105-115 grams/gram mole of oxirane oxygen and a viscosity at 25°C. of 1500-5000 centipoises (BAKELITE ERL-0500) and 70 parts of the arylimide prepared in Example 1 in 130 parts of methylethyl ketone. Glass cloth treated with 3-aminopropyl trimethoxysilane was impregnated by dipping into the methylethyl ketone-resin solution and then drying the cloth in an air circulating oven at 60°-80°C. The resulting glass cloth prepregs were consolidated at 200°C. under a pressure of 100 psi to afford tough nine ply laminates which could not be delaminated. These laminates can be used in electrical and structural applications.

Although the invention has been described in its preferred forms with a certain degree of particularity, it is understood that the present disclosure of the preferred forms has been made only by way of example and that numerous changes may be resorted to without departing from the spirit and scope of the invention.

What is claimed is:

1. Thermosetting resin composition consisting essentially of

A. About 5 to about 95% by weight of an arylimide having the formula:

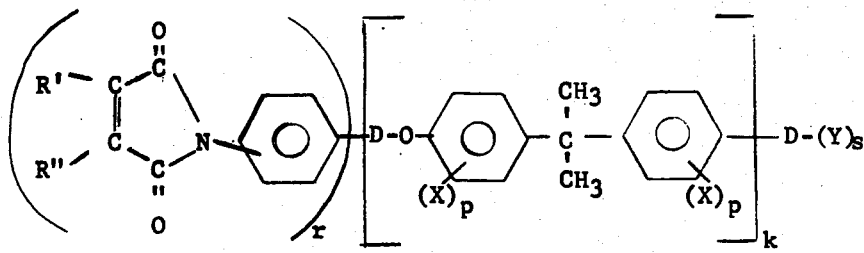

wherein D is at least one rdical selected from the group consisting of:

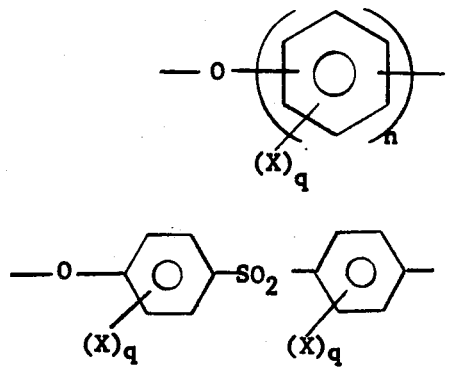

wherein Y is a radical having the formula:

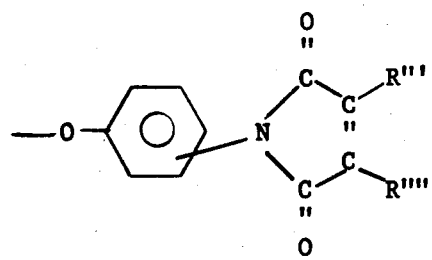

wherein
each of r', R", R''' and R'''' is a monovalent radical selected from the group consisting of H, lower alkyl having 1 to 8 carbon atoms or chlorine, r is an integer having values of 1 to 3,
s is an integer having values of 0 to 3, with the proviso that when s is O, Y is H or X
n is an integer having values of 1 to 5,
k is an integer having values of 0 to 100,
X is a halogen selected from the group consisting of F, Cl, or Br and,
each of q and p are integers having values of 0 to 4, and B. about 95 to about 5% by weight of an epoxy resin having an average of more than one epoxy group,

per molecule.

2. Composition claimed in claim 1 wherein D is

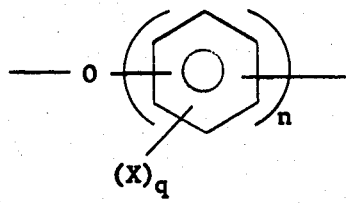

3. Composition claimed in claim 2 wherein n is 3 and X is Cl.

4. Composition claimed in claim 1 wherein D is

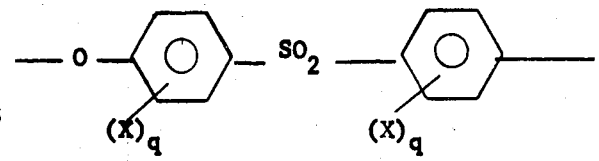

5. Composition claimed in claim 1 wherein s and r are each 1.

6. Composition claimed in claim 1 wherein R', R", R'0"OR'''' are each H.

7. Composition claimed in claim 1 wherein the epoxy resin is a diglycidyl ether of 2,2-bis (p-hydroxyphenyl)-propane 8. Composition claimed in claim 1 wherein the epoxy resin is an epoxylated novolak.

9. Composition claimed in claim 1 wherein the epoxy resin is a tetraglycidyl ether of tetra (p-hydroxyphenyl)ethane.

10. Composition claimed in claim 1 wherein the epoxy resin is a triglycidyl ether of p-aminophenol.

* * * * *

PO-1050
(5/69)

UNITED STATES PATENT OFFICE
CERTIFICATE OF CORRECTION

Patent No. 3,920,768              Dated  Nov. 18, 1975

Inventor(s)  George T. Kwiatkowski

It is certified that error appears in the above-identified patent and that said Letters Patent are hereby corrected as shown below:

Column 4 in the first formula the hydrogen atom on the N within the right hand bracket should be removed Claim 1, column 14, the formula at line 15 should read:

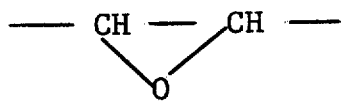

,

Signed and Sealed this

Thirteenth Day of July 1976

[SEAL]

Attest:

RUTH C. MASON
*Attesting Officer*

C. MARSHALL DANN
*Commissioner of Patents and Trademarks*